US005752645A

United States Patent [19]

Phillips et al.

[11] Patent Number: 5,752,645

[45] Date of Patent: May 19, 1998

[54] SUPERCONDUCTIVE RADIOFREQUENCY WINDOW ASSEMBLY

[75] Inventors: Harry Lawrence Phillips, Seaford; Thomas S. Elliott, Yorktown, both of Va.

[73] Assignee: Southeastern Universities Research Ass., Inc., Washington, D.C.

[21] Appl. No.: 608,682

[22] Filed: Feb. 29, 1996

Related U.S. Application Data

[62] Division of Ser. No. 232,759, Apr. 25, 1994, Pat. No. 5,610,567.

[51] Int. Cl.$^{6}$ .................... B23K 31/02

[52] U.S. Cl. .................... 228/124.6; 228/175; 505/927

[58] Field of Search .................... 228/179.1, 208, 228/120, 124.1, 124.6, 175, 262.9; 29/599; 427/62; 505/925, 927

[56] References Cited

U.S. PATENT DOCUMENTS 4,215,327 7/1980 McCrea .................... 333/252
4,719,436 1/1988 Garwin et al. .................... 333/252
5,474,834 12/1995 Tanahashi et al. .................... 428/209

*Primary Examiner*—Samuel M. Heinrich

[57] ABSTRACT

The present invention is a superconducting radiofrequency window assembly for use in an electron beam accelerator. The srf window assembly (20) has a superconducting metal-ceramic design. The srf window assembly (20) comprises a superconducting frame (30), a ceramic plate (40) having a superconducting metallized area, and a superconducting eyelet (50) for sealing plate (40) into frame (30). The plate (40) is brazed to eyelet (50) which is then electron beam welded to frame (30). A method for providing a ceramic object mounted in a metal member to withstand cryogenic temperatures is also provided. The method involves a new metallization process for coating a selected area of a ceramic object with a thin film of a superconducting material. Finally, a method for assembling an electron beam accelerator cavity utilizing the srf window assembly is provided. The procedure is carried out within an ultra clean room to minimize exposure to particulates which adversely affect the performance of the cavity within the electron beam accelerator.

8 Claims, 6 Drawing Sheets

SUPERCONDUCTIVE RADIOFREQUENCY WINDOW ASSEMBLY

This is a divisional of application Ser. No. 08/232,759 filed on Apr. 25, 1994, now U.S. Pat. No. 5,610,567.

The United States may have certain rights to this invention, under Management and Operating Contract DE-AC05-84ER40150 from the United States Department of Energy.

BACKGROUND OF THE INVENTION

1. Field of the Invention

The invention relates to the field of superconducting radiofrequency (srf) window assemblies for transmitting radiofrequency (rf) power from external sources to cavities such as those within an electron beam accelerator.

2. Description of the Related Art

A large number of microwave devices require a vacuum environment in order to operate. Radiofrequency electron beam accelerator cavities, klystrons and magnetrons are a few examples of such devices. It is necessary to introduce or extract microwave energy into or out of these devices between the atmosphere or partial vacuum and a vacuum or higher vacuum. This is commonly accomplished using a component which is transparent to microwave power but functions as a barrier to atmospheric air, dust and debris. These components are generally referred to as "radiofrequency (rf) windows."

Particulate matter adversely affects the performance of electron beam accelerator cavities. Consequently, it is desirable to assemble the cavities entirely within an ultra clean room to minimize the exposure of the cavities to particulates. This procedure requires the direct attachment of an rf window to the cavity, which in turn, imposes certain requirements on the rf windows. The rf window must function as an ultra high vacuum component, i.e., be hermetically sealed and withstand a pressure differential of three (3) atmospheres; operate under cryogenic conditions (2° K.) and withstand thermal cycling from 2° K.to 300° K.; minimize radiofrequency power loss; and transmit a broad band of radiofrequencies. The window may be used as an intermediate window between a cryogenic ultrahigh vacuum and a lesser vacuum that has another window between the atmosphere and the lesser vacuum. Existing rf windows do not adequately possess these features.

SUMMARY OF THE INVENTION

Accordingly, it is a primary object of the present invention to provide a superconducting radiofrequency (srf) window assembly for use in an electron beam accelerator which functions as an ultra high vacuum component, i.e., is hermetically sealed and withstands a pressure differential of three (3) atmospheres.

It is another object of the present invention to provide an srf window assembly for use in an electron beam accelerator which operates under cryogenic conditions and withstands thermal cycling from 2° K.to 300° K.

It is a further object of the present invention to provide an srf window assembly for use in an electron beam accelerator which minimizes RF power loss through a superconducting metal-ceramic design.

It is yet another object of the present invention to provide an srf window assembly for use in an electron beam accelerator which transmits a broad band of radiofrequencies.

It is yet a further object of the present invention to provide a method for providing a ceramic object mounted in a frame which withstands cryogenic temperatures..

A final object of the present invention is to provide an srf window assembly which permits assembling, sealing, and evacuating an electron beam accelerator cavity within an ultra clean room.

The present invention is a superconducting radiofrequency window assembly which has a superconducting metal-ceramic design. A method for providing a ceramic object mounted in a metal frame to withstand cryogenic temperatures is also provided. A new metallization procedure is employed in the construction of the ceramic object-metal frame assembly. Finally, a method for assembling an electron beam accelerator cavity utilizing the srf window assembly is provided. The procedure is carried out in an ultra clean room to minimize exposure to particulates which adversely affect the performance of the cavity within the electron beam accelerator.

BRIEF DESCRIPTION OF THE DRAWINGS

The above and numerous other objects of the invention that may be achieved by the method and preferred embodiment of the invention will be more readily understood from the following detailed description and the appended drawings wherein.

DETAILED DESCRIPTION OF THE INVENTION

The first portion of the following description will focus on the structure of the superconducting radiofrequency window assembly. The second portion of the description will focus on a method for providing a ceramic object having a superconducting layer mounted in a metal member to withstand cryogenic temperatures. The final portion will focus on a method for assembling an electron beam accelerator cavity utilizing the srf window assembly of the present invention. The cavity is assembled entirely within an ultra clean room to minimize exposure to particulates which adversely affect its performance within the electron beam accelerator.

The Superconducting Radiofrequency Window Assembly

Figure 1:
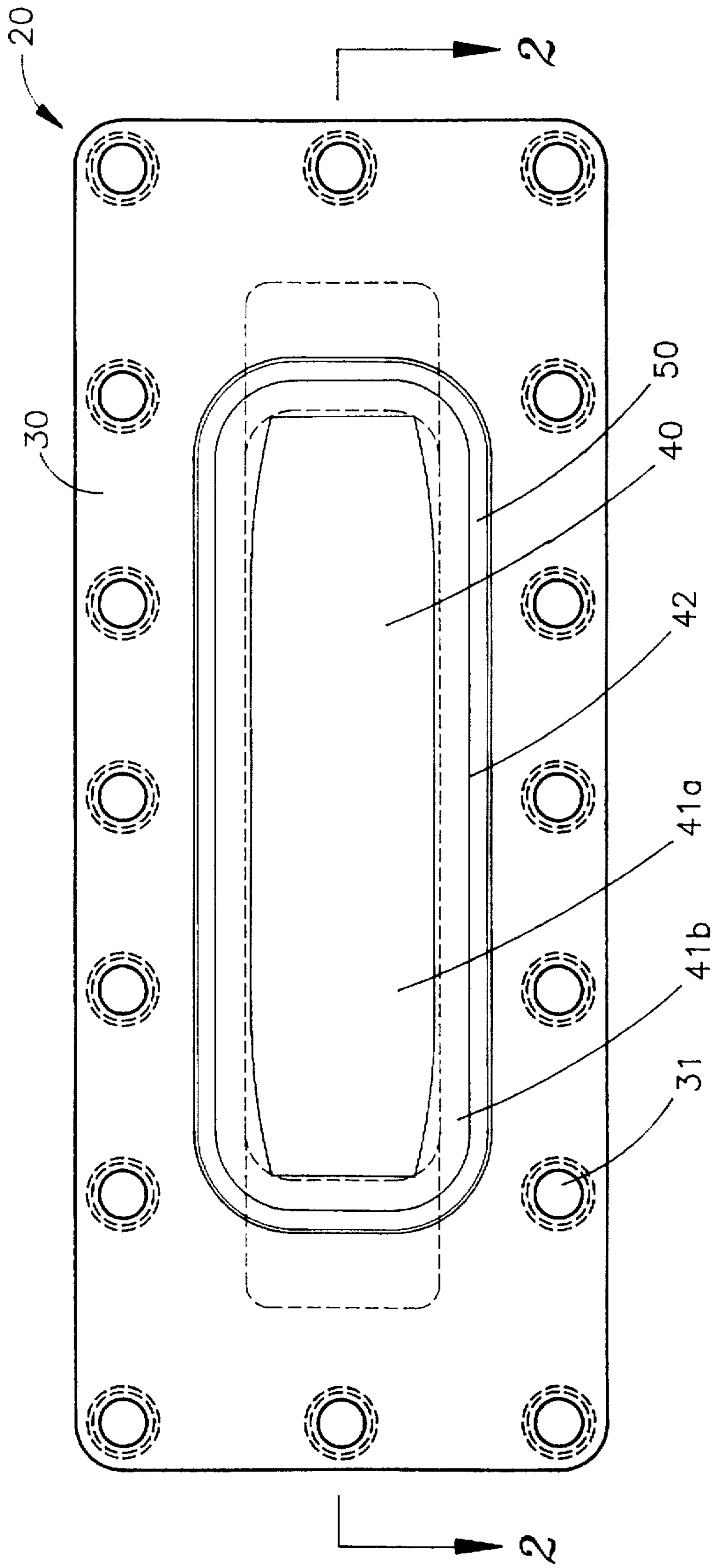
FIG. 1 is a view of the cavity side of the srf window assembly.

Referring now to the drawings in detail, wherein like reference characters indicate like parts throughout the several figures, the reference numeral 20 in FIG. 1, a view of the cavity side of the srf window assembly, refers generally to the srf window assembly. SRF window assembly 20 comprises a superconducting frame 30, a ceramic plate 40, and a superconducting eyelet, shell, foil, or casing 50 for sealing and attaching plate 40 to frame 30.

Frame 30 is made of a superconducting material, preferably niobium. A plurality of bolts 31, preferably made of stainless steel, secure frame 30 to an electron beam accelerator cavity (not shown) and to a waveguide (not shown). An hermetic seal is formed by placing a ductile superconducting material, preferably indium, in the form of a wire (not shown) between frame 30 and the cavity and also between frame 30 and the waveguide prior to tightening bolts 31. The ductile superconducting material functions as a gasket as it is held under pressure and flows to form a seal between frame 30 and the cavity and also between frame 30 and the waveguide.

Plate 40 is made of a low-loss ceramic material, preferably aluminum oxide with traces of magnesium oxide as a sintering agent. Plate 40 is ground to shape and varies in thickness, being thinner at mid-section 41*a* than at edges 41*b*. Plate 40 is thin enough and of a proper material to pass a broad band of radiofrequencies yet thick enough to withstand a pressure differential of approximately three (3) atmospheres.

A selected area 42 of plate 40 is coated by sputtering with a plurality of layers of a plurality of metallic materials such as niobium, niobium-titanium alloy, tungsten, molybdenum, and copper. The first layer is a superconducting material, preferably niobium, which binds strongly to the ceramic to aid in the formation of an hermetic seal. In addition, the superconducting layer supports rf currents with negligible heating and thereby minimizes loss of rf power. The second layer, preferably tungsten, serves as a diffusion barrier so the subsequent brazing material will not alloy with the first layer and thus destroy its adherence or superconducting properties. The third layer, preferably copper, serves as a highly bondable surface which will wet easily in a conventional vacuum brazing process. The multi-layered coating serves to effect an hermetic seal with eyelet 50 and minimizes rf loss.

Eyelet 50 encircles plate 40 and is joined to coated area 42 of plate 40 by a conventional vacuum brazing process, preferably using a silver-copper eutectic alloy. An hermetic seal is thereby formed between plate 40 and eyelet 50. Eyelet 50, preferably made of niobium, facilitates sealing of plate 40 to frame 30 and also serves as an expansion member between plate 40 and frame 30. A small gap between eyelet 50 and frame 30 allows expansion and contraction of eyelet 50 which helps to prevent fracturing of plate 40. Hermetic sealing of eyelet 50 to frame 30 is accomplished by electron beam welding.

SRF window assembly 20 is located between an electron beam accelerator cavity flange (not shown) and a waveguide flange (not shown). Frame 30 of assembly 20 is attached and sealed to each flange using a plurality of bolts 31 and a ductile seal, as described above.

The superconducting metal-ceramic design described above allows srf window assembly 20 to minimize rf power loss, to function as an ultra high vacuum component and withstand a pressure differential of approximately three (3) atmospheres, and to operate at cryogenic temperatures (2° K.) and withstand thermal cycling from 2° K.to 300° K.

Figure 2:
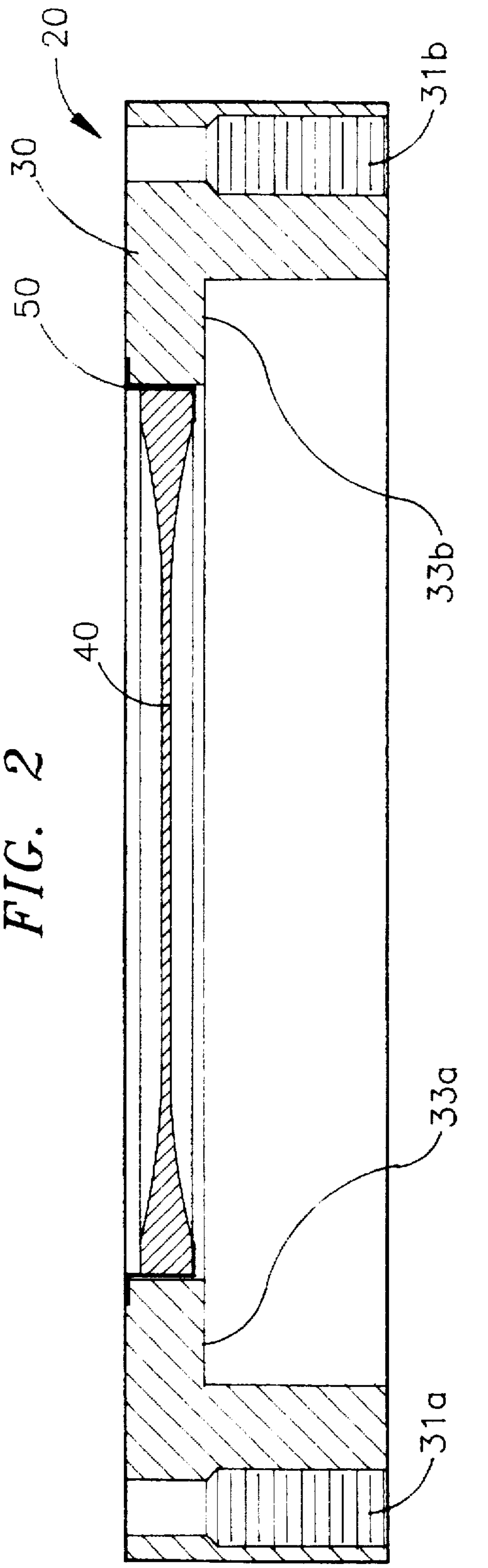
FIG. 2 is a longitudinal cross section of the srf window assembly.

FIG. 2, a longitudinal cross section of the srf window assembly, shows plate 40 encircled by eyelet 50 and joined to frame 30. Cross sections of bolt shafts 31*a*, 31*b* are also shown. Inductive irises 33*a*, 33*b* of frame 30, to which eyelet 50 is attached, are in direct contact with a waveguide (not shown) and serve to balance the reflection of rf energy by plate 40. The entire window assembly is broad-band, i.e., it must pass frequencies that are higher than its design frequency of 1500 megahertz (MHz) and, consequently, it reflects rf energy. An equal and opposite reflection of rf energy from inductive irises 33*a*, 33*b* cancels the reflection from plate 40, thus making the net reflection as close as possible to zero (0) at the design frequency of 1500 MHz. As the frequency increases to 1700–1900 MHz, the reflection is not zero (0) but is still tolerably small because of this particular design feature.

Figure 3:
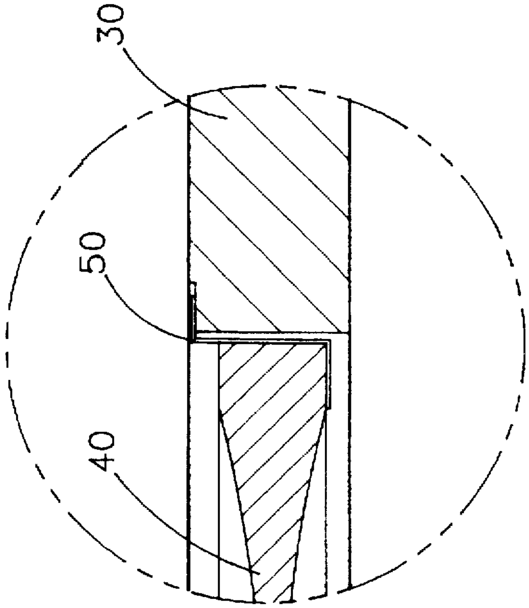
FIG. 3 is a detailed cross-sectional view of the seal between the frame and the eyelet encircling the plate.

FIG. 3, a detailed area of the longitudinal cross section of FIG. 2, shows the seal between eyelet 50, which encircles plate 40, and frame 30. A small gap between eyelet 50 and frame 30 allows expansion and contraction of eyelet 50 and thereby helps to prevent fracturing of plate 40. Hermetic sealing of shell 50 and frame 30 is accomplished by a suitable joining method, preferably electron beam welding.

Figure 4:
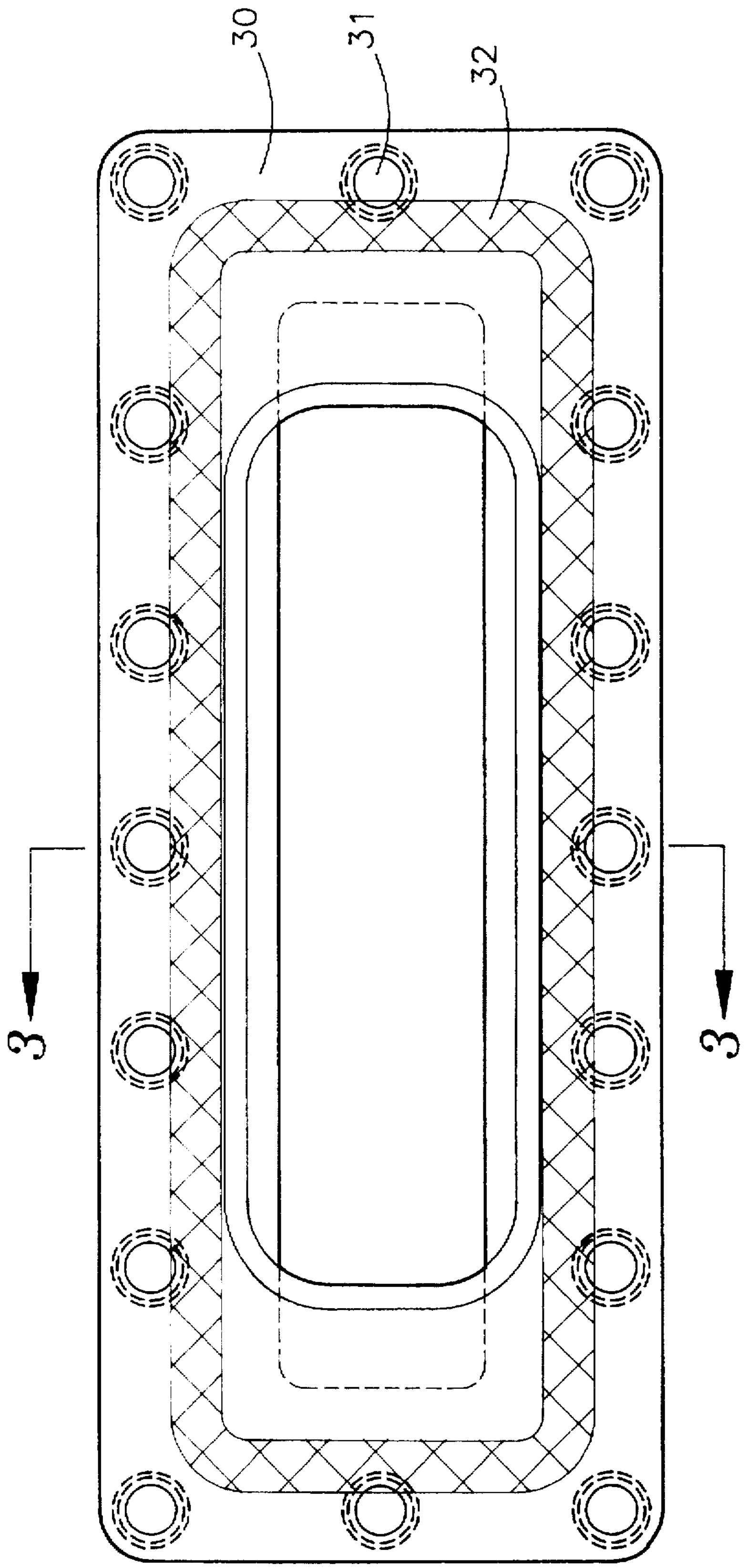
FIG. 4 shows the sealing area of the frame, which is represented by cross-hatches.

FIG. 4 shows sealing area 32 of frame 30, which is represented by cross-hatches. An hermetic seal is formed by placing a ductile superconducting material, preferably indium, in the form of a wire (not shown) within sealing area 32 on both sides of frame 30 prior to tightening bolts 31. The ductile superconducting material functions as a gasket as it is held under pressure and flows to form a seal between frame 30 and the electron beam accelerator cavity (not shown) and also between frame 30 and the waveguide (not shown).

Figure 5:
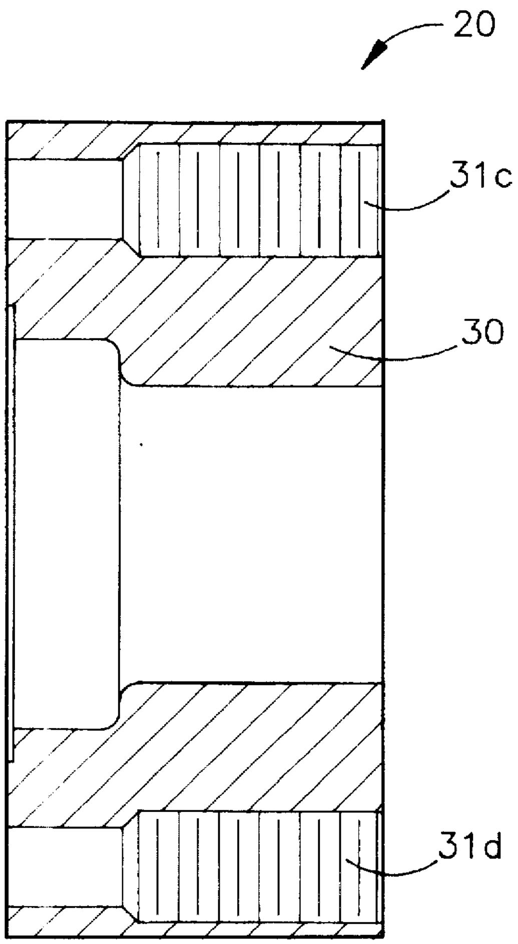
FIG. 5 is a transverse cross section of the srf window assembly along section 5—5 of FIG. 4.
Figure 6:
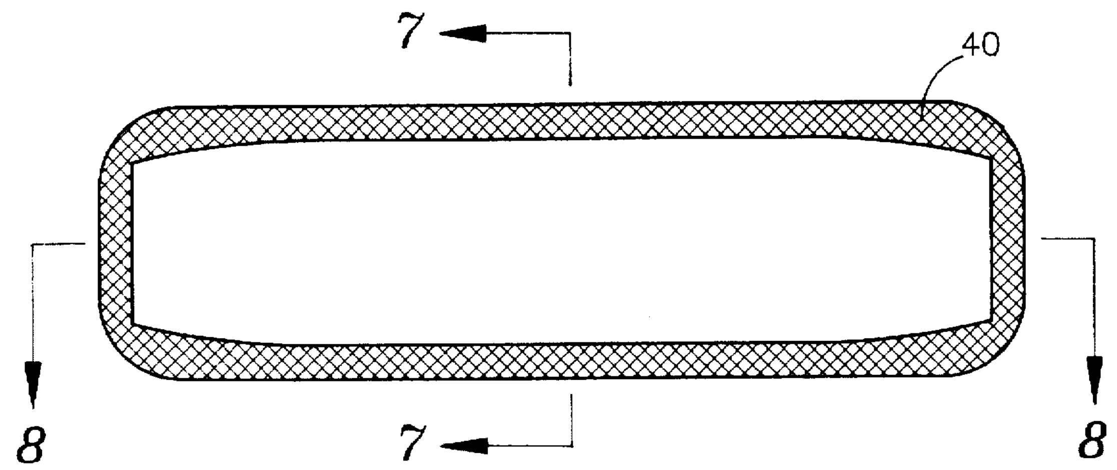
FIG. 6 illustrates the variation in thickness of the plate, with the cross-hatched areas representing the thicker portions.
Figure 7:
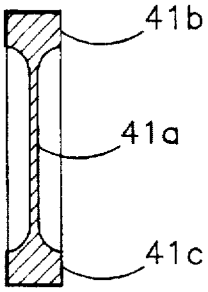
FIG. 7 is a transverse cross section of the plate along section 7—7 of FIG. 6 which shows the variation in thickness of the plate.
Figure 8:
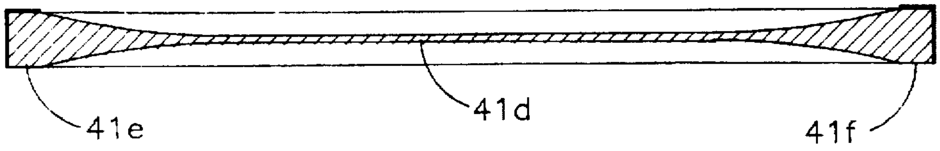
FIG. 8 is a longitudinal cross section of the plate along section 8—8 of FIG. 6 which shows the variation in thickness of the plate.

FIG. 5, a transverse cross section of srf window assembly 20 along section 5—5 of FIG. 4, shows frame 30 and bolt shafts 31*c*, 31*d*. FIG. 6 shows the variation in thickness of plate 40, with the thicker portion shown in cross-hatch. FIG. 7, a transverse cross section of plate 40 along section 7—7 of FIG. 6, shows the variation in thickness of plate 40, which is thinner at mid-section 41*a* than at outer ends 41*b*, 41*c*. FIG. 8, a longitudinal cross section of plate 40 along section 8—8 of FIG. 6, shows the variation in thickness of plate 40, which is thinner at mid-section 41*d* than at outer ends 41*e*, 41*f*.

Figure 9:
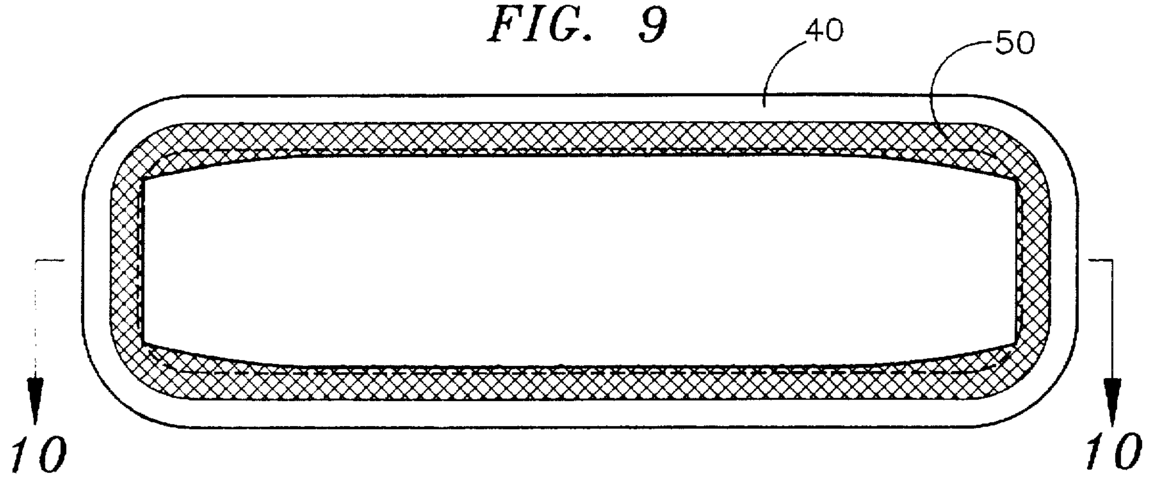
FIG. 9 is a view of the cavity side of the plate encircled by the eyelet.
Figure 10:
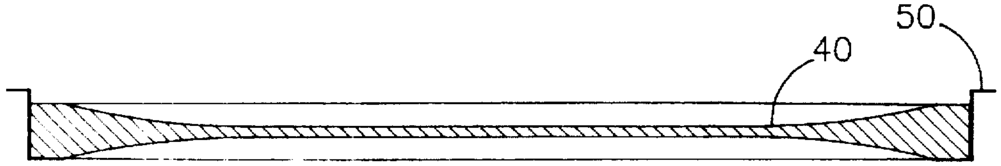
FIG. 10 is a longitudinal cross section of the plate encased within the eyelet.
Figure 11:
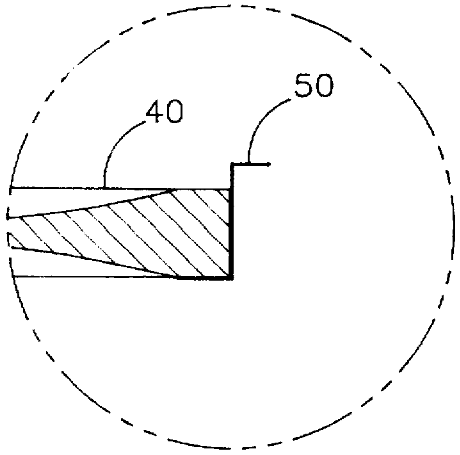
FIG. 11 is a detailed cross-sectional view of one end of the plate encased within the eyelet.

FIG. 9 shows the cavity side of plate 40 encircled by eyelet 50. FIG. 10, a longitudinal cross section along section 10—10 of FIG. 9, shows zig zag-shaped eyelet 50 encircling plate 40. Sealing of eyelet 50 to plate 40 is accomplished by brazing, preferably with a silver-copper eutectic alloy. FIG. 11, a detailed area of the longitudinal cross section of FIG. 10, shows the seal between eyelet 50 and plate 40. Eyelet 50 extends slightly above plate 40 on the cavity side.

Method for Providing a Ceramic Object with a Superconducting Layer Mounted In a Metal Member A method for providing a ceramic object with a superconducting layer mounted in a metal member to withstand cryogenic temperatures is provided. A selected area of the ceramic object is metallized and joined to a metal eyelet, preferably by brazing. The metal eyelet is then joined to a metal frame, preferably by electron beam welding.

The ceramic material is preferably a translucent polycrystalline alumina such as Transtar™ (Ceradyne, Costa Mesa, Calif.) or a high-purity alumina such as Amalo 87™ (Astro Met, Cincinnati, Ohio), which is typically 99.99% $Al_2O_3$ or better. The ceramic parts are wrapped in lint-free paper for the purpose of storage at various points during the following procedures.

The ceramic objects are prepared for the metallization procedure. The preparation includes the steps of grinding, inspecting, cleaning and air-firing. After a conventional grinding procedure, the surfaces of each ceramic part are inspected under a fluorescent magnifying light fixture, and those parts having unacceptable imperfections are rejected. Unacceptable imperfections include cracks, and pits, fissures or voids with a length-to-depth or width-to-depth ratio of less than two (2) to one (1), for example. The acceptable ground ceramic objects are subjected to a conventional cleaning procedure and then air-fired at approximately 1000° C. for approximately 30 minutes. The ceramic parts are inspected for imperfections as before.

A selected area of each acceptable ceramic object is then metallized so that a superconducting eyelet may be brazed to each part in order to effect an hermetic seal. Since rf currents must flow over the surface of the metallized layer where it is in contact with the ceramic, undesirable heating will occur if conventional metallization techniques are employed. To avoid the undesirable heating, the metal in contact with the ceramic must be a superconductor. The metallization procedure involves the deposition of a superconducting layer, a diffusion barrier layer, and a bondable layer.

The deposition of the metal layers is achieved using a conventional sputtering technique. The parts are masked with fixtures so that only those areas to be metallized are exposed. The masked ceramic parts are stacked on the turntable of the deposition chamber, which is set to rotate at approximately 20 revolutions per minute. The exposed areas are ion-etched for approximately five (5) minutes with an argon ion flux of approximately 0.2 milliamperes (mA) per centimeter squared ($cm^2$) at an ion energy of approximately 800 electron volts (ev). The ion energy is then reduced to approximately 53 ev at a flux of approximately 0.2 $mA/cm^2$. A superconducting material, preferably niobium, is sputtered onto the etched areas at a rate of approximately 0.9 angstrom (Å) per second (s) to a total thickness of approximately 3000 Å. The superconductor forms a strong bond to the ceramic to aid in the formation of an hermetic seal and supports RF currents with negligible heating due to its unique properties. A barrier material, preferably tungsten, is then sputtered onto the superconductor-coated areas at a rate of approximately 0.9 Å/s to a total thickness of approximately 3000 Å. The tungsten acts as a diffusion barrier so the subsequent brazing metals will not alloy with the niobium and destroy its adherence or superconducting properties. Finally, a brazable material, preferably copper, is sputtered onto the barrier-coated areas at a rate of approximately 0.9 Å/s to a total thickness of approximately 4000 Å. The copper serves to create a highly bondable surface which will wet easily in a conventional vacuum brazing process.

The metallized ceramic objects are then removed from the deposition chamber and inspected for unacceptable imperfections as before. Each acceptable object is joined to a superconducting eyelet by a conventional vacuum brazing process and the brazed object-eyelet assembly is joined to a superconducting frame, preferably by electron beam welding, as described in the following section of the detailed description.

Method for Assembling an Electron Beam Accelerator Cavity

A method for assembling an electron beam accelerator cavity utilizing the srf window assembly of the present invention is provided. The complete cavity is assembled entirely within an ultra clean room to minimize exposure to particulates which adversely affect its performance within the continuous electron beam accelerator.

A superconducting radiofrequency window assembly, comprising a superconducting frame, a ceramic plate, and a superconducting eyelet for sealing the plate within the frame, is assembled within the ultra clean room using prepared parts. The individual parts, i.e., the frame, plate, and eyelet, are prepared in areas outside of the ultra clean room.

A superconducting eyelet, preferably made from an approximately 0.005" thick sheet of reactor-grade niobium which has been formed to support the ceramic plate within the superconducting frame, is inspected for imperfections under a fluorescent magnifying light fixture. Unacceptable imperfections are cracks, tears, and fissures, for example. Acceptable eyelets are subjected to a conventional cleaning procedure and final inspection.

The eyelets are then metallized with a brazable material using a conventional sputtering technique. Each eyelet is masked so that only those areas which are to be brazed to a ceramic plate are exposed. The masked eyelets are placed onto a turntable of the deposition chamber. The exposed areas are ion-etched for approximately five (5) minutes with an argon ion flux of approximately 0.2 $mA/CM^2$ at an ion energy of approximately 800 ev. The ion energy is then reduced to approximately 53 ev at a flux of approximately 0.2 $mA/cm^2$. A metal, preferably copper, is sputtered onto the etched areas at a rate of approximately 100 Å/s for approximately 100 seconds so that a total of 10,000 Åare deposited. The eyelets are removed from the deposition chamber and masks, and inspected for imperfections as before.

A ceramic plate which has been ground to shape, cleaned, and metallized according to the metallization procedure described in a previous section of this detailed description, is inserted into a prepared eyelet so that the metallized areas of the plate are in contact with the metal-coated areas of the eyelet. Each plate and eyelet assembly is brazed together using an alloy, preferably a silver-copper eutectic alloy. The assemblies are heated in the furnace at approximately 780° C. for approximately 15–20 minutes and then brazed at 830° C. for approximately ten (10) minutes. The brazed assemblies are removed from the furnace, cooled, and inspected for imperfections including cracks, pits, fissures, and voids with a length-to-depth or width-to-depth ratio of less than two (2) to one (1), and distortions. The brazed assemblies are subjected to repeated thermal cycling from 300° K.to 77° K.using a conventional thermal cycling cabinet. The brazed assemblies are then checked for leaks with helium using conventional leak detecting equipment. The ceramic portion of each brazed assembly is cleaned selectively with a sandblaster. The whole assembly is then subjected to a conventional cleaning procedure and final inspection.

A superconducting frame, preferably made of niobium, is inspected for imperfections, and the internal diameter (i.d.) of the threads within the frame are checked using plug gauges. The frame is wet-sanded and subjected to a conventional cleaning procedure. The frame is etched with a buffered chemical polish to remove oxidation residue and then subjected to a final conventional cleaning procedure and inspection.

The prepared frame and brazed assembly are transported to the ultra clean room, where they are joined by electron beam welding, thus forming a superconducting radiofrequency window assembly. The weld is checked for imperfections and for leaks using conventional leak detecting equipment. The srf window assemblies are subjected to repeated thermal cycling from 300° K to 77° K.using a conventional thermal cycling cabinet for at least ten (10) cycles. The assemblies are tested for leaks once again. The weld joints are etched with a buffered chemical polish to remove oxidation residue.

Each acceptable srf window assembly is sealed to an electron beam accelerator cavity and to a waveguide using a plurality of bolts, preferably stainless steel, and a ductile metallic gasket, preferably indium wire. The srf window assemblies are subjected to a final leak check using conventional equipment.

The advantages of the present invention are numerous. The superconducting radiofrequency window assembly facilitates the assembling, sealing, and evacuating of an electron beam accelerator cavity within an ultra clean room. This procedure minimizes exposure of the cavity to particulates which adversely affect its performance within the electron beam accelerator. The superconducting metal-ceramic design of the srf window assembly enables it to operate under cryogenic conditions (2° K.), withstand thermal cycling from 2° K.to 300° K, withstand a pressure differential of three (3) atmospheres, minimize the loss of radiofrequency power, and transmit a broad band of radiofrequencies. These features are required of radiofrequency windows which are directly attached to electron beam accelerator cavities during the cavity assembly procedure described herein. Many variations will be apparent to those skilled in the art. It is therefore to be understood that, within the scope of the appended claims, the invention may be practiced other than is specifically described.

What is claimed as new and desired to be secured by Letters Patent of the United States is:

1. A method for providing a ceramic object with a superconducting layer mounted in a metal member, comprising the steps of:

(a) providing a ceramic object;

(b) preparing at least one selected area of said ceramic object for receiving a first coating of a material;

(c) depositing a layer of a superconducting material onto said selected area of said ceramic object;

(d) depositing a barrier layer onto said layer of superconducting material;

(e) depositing a bondable layer onto said barrier layer; and (f) attaching said said ceramic object to a metal member using said bondable layer.

2. A method for providing a ceramic object with a superconducting layer mounted in a metal member as recited in claim 1, wherein said preparation comprises the steps of:

(a) cleaning said ceramic object;

(b) air-firing said ceramic object in a furnace;

(c) cooling said ceramic object;

(d) masking a plurality of areas on said ceramic object;

(e) placing said ceramic object onto a turntable within a deposition chamber; and (f) directing a stream of argon ions at a plurality of exposed areas of said ceramic object.

3. A method for providing a ceramic object with a superconducting layer mounted in a metal member as recited in claim 1, wherein said ceramic object is made of aluminum oxide.

4. A method for providing a ceramic object with a superconducting layer mounted in a metal member as recited in claim 1, wherein said depositing step is accomplished by sputtering.

5. A method for providing a ceramic object with a superconducting layer mounted in a metal member as recited in claim 1, wherein said superconducting layer is a metal selected from the group consisting of niobium and niobium-titanium alloy.

6. A method for providing a ceramic object with a superconducting layer mounted in a metal member as recited in claim 1, wherein said barrier layer is made of a metal selected from the group consisting of tungsten and molybdenum.

7. A method for providing a ceramic object with a superconducting layer mounted in a metal member as recited in claim 1, wherein said bondable layer is made of copper.

8. A method for providing a ceramic object with a superconducting layer mounted in a metal member as recited in claim 1, wherein said attaching step is accomplished by brazing.

* * * * *